March 26, 1940.  E. R. GEIB ET AL  2,195,329
ALTERNATING CURRENT LIGHT-PRODUCING SYSTEM AND METHOD OF OPERATING SAME
Filed Aug. 25, 1938
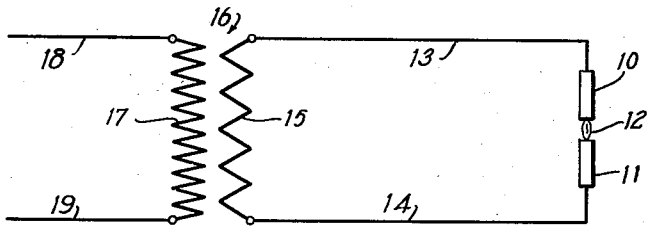
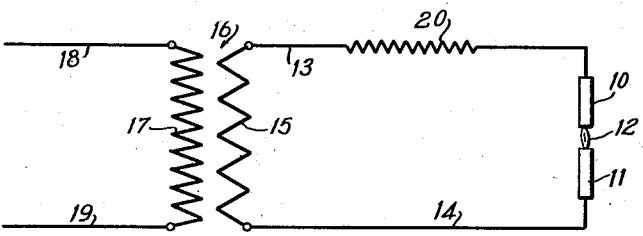
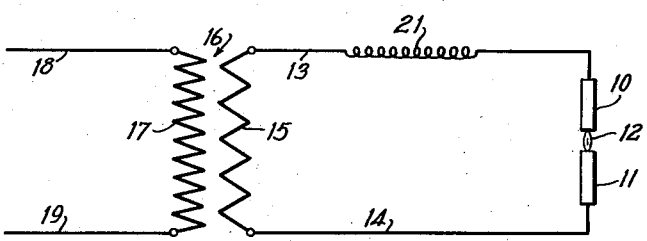
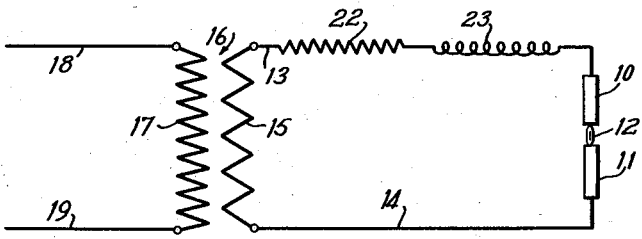
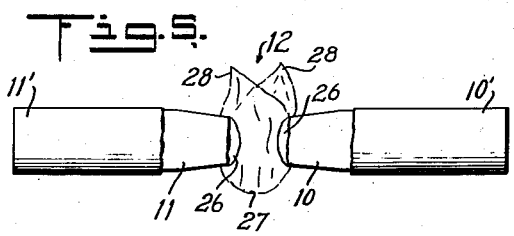
INVENTORS
ERVIN R. GEIB
STEPHEN W. ORNE
DAVID B. JOY
BY
ATTORNEY Patented Mar. 26, 1940

2,195,329

UNITED STATES PATENT OFFICE 2,195,329

ALTERNATING CURRENT LIGHT-PRODUCING SYSTEM AND METHOD OF OPERATING SAME

Ervin R. Geib, Cleveland, and Stephen W. Orne and David B. Joy, Fostoria, Ohio, assignors, by mesne assignments, to Union Carbide and Carbon Corporation, a corporation of New York Application August 25, 1938, Serial No. 226,678

15 Claims. (Cl. 176—12)

This invention relates to an alternating current light-producing system and particularly to a method of operating such a system, in a preferred embodiment to produce a low-voltage high-intensity arc between a pair of electrodes, which system is characterized in that it provides an arc which is very steady and contains a source of light of high intrinsic brilliancy concentrated into a relatively small volume near the electrode tips. Preferably, cored carbon electrodes are employed and the core materials are so selected that the light energy produced in accordance with this invention will furnish, in preponderance, radiation within selected portions of the visible or invisible spectrum, for such uses as motion picture projection, therapeutic or biological treatments, and industrial applications such as the irradiation of foods and other materials. The principles of the invention are specifically described herein as applied in conjunction with optical systems for projecting motion pictures. This application contains subject matter in common with our copending application Serial No. 667,420, filed April 22, 1933.

In the projection of motion pictures by means of the optical systems customarily employed for the purpose it is necessary to have a source of visible light of high intrinsic brilliancy. This is a primary requisite in order that adequate screen illumination can be obtained from a light source of small volume since diffused light or light of low intrinsic brilliancy cannot be sharply focused in the optical systems of projection devices. Additionally, the light source must be stable as to position and it must furnish light of constant intensity. This second requirement is imposed by the necessity of illuminating uniformly the screen area and to prevent substantial variation in its brilliance. The proper color of the light is another requirement for the satisfactory projection of pictures. For ordinary black and white and for some types of color films, the light should be preponderantly blue-white in color; other types of color films require light containing a substantial amount of red or of those colors in or near the red portion of the spectrum.

It has not heretofore been possible to meet all of the foregoing requirements through the use of an alternating current arc light source, and an important object of this invention is the elimination of difficulties previously encountered and the provision of a light-producing system including an alternating current arc capable of fulfilling in high degree the conditions above set forth.

Other objects of this invention include the provision of such an alternating current arc-producing system requiring simple and inexpensive electrical equipment and which consumes relatively small quantities of electrical energy; the provision of such a light-producing system including a steady and uniform alternating current high-intensity arc characterized in that it contains a source of light of high intrinsic brilliancy concentrated into a relatively small volume near each of the electrode tips; and the provision of such a light-producing system including an alternating current low-voltage high-intensity arc having portions of radiant energy concentrated into a relatively small volume near the tip of each electrode, and in which the light source may be caused predominantly to supply radiation within selected portions of the visible or invisible spectrum.

The above and other objects and novel features of the invention will be apparent from the following description and the accompanying drawing, in which:

Fig. 1 is a diagrammatic illustration of an alternating current light-producing system embodying the principles of the invention;

Figs. 2, 3 and 4 illustrate modifications of the embodiment shown in Fig. 1; and Fig. 5 diagrammatically illustrates the type of alternating current arc which is produced between the electrodes of Figs. 1 to 4.

In accordance with the principles of this invention, three conditions must prevail in order to accomplish the desired results. First, it has been found that the alternating current arc must be operated under high intensity conditions. For this reason, carbon electrodes capable of operating at relatively high current densities are employed and for maximum constancy, the arc should be short, operated at low voltage.

Second, the carbon electrodes preferably should be provided with a core containing a considerable amount of flame-producing material. Satisfactory results have been obtained with carbon electrodes, each of which is provided with a core containing flame-producing material of an amount more than about 10% of the entire weight of the electrode. The maximum amount of flame-producing substances is governed solely by the limitations of manufacturing cored electrodes which are capable of being uniformly consumed in service. Practically, this amount is about 35% of the electrode weight. (These percentages refer to the carbon of the electrode plus its core material and do not include copper sheathing or other conducting surfaces which may be used to facilitate conduction of heavy current by the electrode.) We have found that the amount of useful light produced increases with the amount of flame-producing material employed. For many purposes, cored electrodes in which the core contains flame-producing material equal to about 23% by weight of the electrode have proved to be highly useful.

Third, it is essential to operate these cored electrodes, which contain a substantial amount of flame-producing material, at an alternating current density of more than about 550 amperes per square inch while maintaining in a preferred embodiment of the invention, a potential not greatly in excess of 31 volts nor less than about 22 volts between said electrodes in order to produce a steady light source of sufficiently high intrinsic brilliance and concentrated into a relatively small volume near each of the adjoining electrode tips. While the above-described electrodes give satisfactory results at current densities as low as 550 amperes per square inch, better results are obtained for motion picture projecting systems with current densities of at least about 700 amperes per square inch up to about 1200 amperes per square inch. Of course, the above-noted arc voltage range will vary slightly depending upon the diameter of the electrodes and type of circuit employed, and this range applies to electrodes of about 7–8 mm. diameter in circuit with a high reactance transformer, the no-load voltage of which is about 40% higher than the load voltage. This voltage range is only intended to indicate the approximate values of voltage which should be maintained in order to insure good operation under the specific circumstances stated.

A particularly desirable phenomenon occurs while operating the above-described electrodes within the above-mentioned range of current densities which affords excellent arc stability; namely, that the adjoining faces of the electrode tips remain substantially flat. Above a current density of about 1200 amperes per square inch, the ends or faces of the electrodes assume a slight concave form. The current density at which this concavity begins to appear depends to some extent on the amount and nature of the flame-producing material employed and the size of the cores of the electrodes.

In the economical operation of the light-producing system of this invention using such high alternating current densities, it is preferred to connect the electrodes with a source of alternating current through a transformer which has a reactance sufficiently high to lend stability to the arc.

Referring to Fig. 1 of the drawing, a suitable light-producing system embodying this invention comprises a pair of cooperating cored carbon electrodes 10 and 11 between which an arc 12 can be established. The electrodes 10 and 11 form part of an electric circuit and are connected, respectively, to conductors 13 and 14 which, in turn, are connected to a secondary winding 15 of a high-reactance step-down transformer 16. Suitable conductors 18 and 19 leading from a source of suitable alternating current supply are connected to the primary winding 17 of the transformer 16.

Instead of employing a transformer having enough reactance to provide adequate arc stability, it may be desirable in some cases to employ a standard step-down transformer, and to provide additional impedance in series relation with either the primary or secondary winding of the transformer. In Figs. 2, 3 and 4 of the drawing are shown various ways in which the additional impedance may be provided in series with the transformer. In Fig. 2 additional impedance to improve arc stability is provided by connecting a resistor 20 in series with the electrodes 10 and 11. In Fig. 3 a similar result is obtained by inserting a reactor 21 in the circuit in place of the resistor 20 of Fig. 2. Fig. 4 shows another modification of the arrangement in which both a resistor 22 and a reactor 23 are connected in series with the electrodes 10 and 11.

By energizing the electrodes in the manner described, considerable economy is effected in the operation of the alternating current arcs at the high current densities required in the practice of this invention. Moreover, the power factor of the electrical energy consumed by such systems is relatively high.

Fig. 5 is an enlarged view somewhat diagrammatically illustrating cooperating portions of the cored carbon electrodes 10 and 11 and a type of arc 12 which is produced in accordance with the principles of this invention. The electrodes 10 and 11 may be provided with copper coatings 10' and 11' to facilitate the supply of alternating current of high amperage to the electrodes at points near their tips. As the carbons are consumed the copper coating continually melts away, so that it is never sufficiently close to the tip of the carbon to enter the arc stream. The low-voltage high-intensity arc 12 comprises portions 26 of light of high intrinsic brilliancy concentrated into a relatively small volume near each of the electrode tips; a ball-shaped portion 27 of lower intrinsic brilliancy; and tail flame portions 28. The portions 26 constitute the concentrated sources of usable light and they may be used jointly or separately depending upon the nature of the projecting apparatus to be employed. In order to maintain the above-described characteristics of the arc 12, it is necessary to observe certain limitations relative to arc length and arc voltage. If the arc length becomes too short, the resistance of the arc decreases, consequently the voltage across the arc decreases and the current rises causing the copper coatings 10' and 11' to melt away too rapidly and too far from the electrode tips, thereby rendering the arc unsteady and the same may blow out. On the other hand, if the arc length becomes too long, the resistance of the arc gap increases, less current flows, the light becomes less intense, and the arc "flops" about the electrode tips.

To further illustrate the invention, the following table presents a few specific examples of cored carbon electrodes and current densities which have been used in high intensity alternating current arcs to produce light of high intrinsic brilliancy of the character described. Each electrode contained approximately 23% by weight of flame-producing material.

| Electrode diameter, millimeters | Arc voltage | Current amperes | Arc length inches | Current density, amperes per square inch |
|---|---|---|---|---|
| 6 | 22–25 | 40–45 | 0.19–0.28 | 920–1030 |
| 7 | 23–26 | 60–65 | 0.21–0.31 | 1000–1080 |
| 8 | 24–29 | 75–80 | 0.23–0.35 | 970–1030 |
| 9 | 26–31 | 95–100 | 0.25–0.38 | 970–1020 |

The light sources from previously known alternating current arcs proposed for the projection of motion pictures and the like are of low intrinsic brilliancy (approximately 100 to less than 180 candle power per square millimeter). By comparison, the novel light-producing system of this invention is characterized by light sources having an intrinsic brilliancy of between 235 and 290 candle power per square millimeter which varies, of course, with the size of the electrodes and the magnitude of the alternating current used.

As an example of the economy and nature of a particular installation, light of high intrinsic brilliancy was produced in accordance with this invention using cored carbon electrodes, each 8 millimeters in diameter and containing 23% by weight of flame-producing material. Alternating current was supplied to the electrodes from a 115 volt source using a 3.6 k. v. a. step-down transformer having a ratio of transformation of 2.7. The reactance of this transformer was sufficiently high to insure good arc stability. The electrodes were adjusted to form a gap of approximately 0.35 inch and to produce an arc of 80 amperes and 28 volts. With arc current of 80 amperes for the 8 millimeter electrodes, the current density was about 1030 amperes per square inch. The power required to operate this system was about 2340 watts and its power factor was about 0.67.

When the same arc of 80 amperes and 28 volts was obtained by connecting the electrodes directly to the 115 volt source of alternating current using a resistor in series with the electrodes, the system required 290% more power than was consumed by the installation described above. On the other hand, when the same arc of 80 amperes and 28 volts was established between electrodes connected directly to the 115 volt source of alternating current using a reactor in series with the electrodes, the amount of power consumed was not substantially increased over that of the first described system, but the power factor of the load dropped to about 0.26.

It will thus be seen that an arrangement including a transformer as described makes possible the economical operation of a light-producing system in which cored carbon electrodes containing substantial amounts of flame-producing materials are energized at high current densities to produce an alternating current low-voltage high-intensity arc of novel form and character which includes a source of steady and uniform light of high intrinsic brilliancy concentrated within a relatively small volume near each of the tips of the electrodes.

The light produced as described herein is of special value in the projection of motion pictures because the concentrated sources adjacent the electrode tips may be readily focused either singly or together by means of the usual optical systems to provide adequate and uniform screen illumination. The flame-producing material may, for example, consist of one or more compounds of the rare earth metals, such as the fluorides or oxides of the cerium group of rare earth metals. These rare earth metal compounds result in the production of a predominantly blue-white light which is especially useful and virtually necessary for the projection of motion pictures from black and white and from certain types of color films. In these electrodes, the flame-producing material usually is combined with other materials to form the core. Thus, potassium or sodium silicates may be included to assist in maintaining a steady burning arc and to eliminate sputtering, but these substance are not used in amounts large enough to affect the color of the light produced. Cores for electrodes designed to produce blue-white light of high intrinsic brilliancy may, for example, be composed of 70 parts of a rare earth metal fluoride as the flame-producing material, 5 parts of potassium silicate and 25 parts of carbon.

If light which predominates in color other than blue-white is desired, any of the well-known color flame-producing alkali metal or alkaline earth metal compounds may be substituted for a part or all of the rare earth metal compounds. For example, in the projection of motion pictures from certain types of color films, a modified blue-white light source is required which contains light of the red portion of the spectrum. Light of high intrinsic brilliancy and of suitable color for this purpose may be produced in accordance with our invention by including, in the flame-producing material of the cored carbon electrodes, either alone or in combination with the rare earth metal compounds thereof, materials known to yield red coloration, such as compounds of strontium or calcium. Thus, it will be apparent that control of the color characteristics of the light produced in accordance with this invention may be accomplished by appropriate additions to the flame-producing materials of the electrode.

The materials used in modifying the composition of the electrode cores not only influence the color of the arc 12, but they also modify similarly the color of the intense luminescent light sources 26 at the tips of the electrodes 10 and 11, to produce the desired concentrated light of high intrinsic brilliancy which is a feature of the novel arc form of this invention.

It will be evident that the principles of the invention can be adapted to other systems where light of high intrinsic brilliancy is required in light therapy, industrial irradiation and illumination and elsewhere. The invention is not limited in scope to the particular systems described above but includes related light-producing systems embodying the principles of the invention and employing carbon electrodes having cores containing such metals as nickel, iron, cobalt, and tungsten and their compounds.

We claim:

1. A system for producing a source of light of high intrinsic brilliancy comprising the combination of similar electrodes arranged in arc relationship, each electrode having a core containing flame-producing material, the weight of such material in a core being more than about 10 per cent of the weight of said electrode; and a source of alternating current in circuit with said electrodes and providing in each electrode a current density greater than about 550 amperes per square inch.

2. The combination of a circuit including similar cooperating carbon electrodes having substantially the same diameter and composition arranged to have an arc established therebetween; each electrode having a core containing flame-producing material comprising more than about 10 per cent of the entire weight of said electrode; and means, including a source of alternating current connected to and having a current density greater than about 550 amperes per square inch in said electrodes, for producing separate sources of light of high intrinsic brilliancy confined within a relatively small volume near each of the tips of said electrodes.

3. A method of producing a concentrated steady and uniform light source of relatively small volume near each of the tips of a pair of electrodes which comprises connecting to a source of alternating current, and in arc-producing relation, two similar electrodes each having a core of substantially the same flame-producing material and of substantially the same diameter, and operating said electrodes at an alternating current density within the range sufficient to produce separate light sources of high intrinsic brilliancy confined within a relatively small area adjacent to each of said electrodes.

4. A method of operating substantially identical carbon electrodes having adjoining ends, each electrode having a core containing flame-producing material, the weight of such material in a core being more than about 10 per cent of the weight of said electrode, which comprises passing an alternating current through said electrodes capable of producing therein a current density of at least 550 amperes per square inch to provide an arc therebetween, such arc being characterized by the fact that a source of light of high intrinsic brilliancy is produced and confined within in a relatively small volume about each of the electrode tips and with the ends of said electrodes remaining substantially flat.

5. A method of producing steady and uniform concentrated light sources of relatively small volume near each of the tips of a pair of electrodes which comprises placing in arc producing relation two similar carbon electrodes having cores of substantially identical flame-producing material, and of substantially the same diameter, and passing through said electrodes an alternating current of sufficient intensity to provide a current density of at least 550 amperes per square inch in each electrode.

6. A method of producing steady and uniform concentrated light sources of relatively small volume near each of the tips of a pair of electrodes which comprises placing in arc producing relation two similar carbon electrodes of substantially the same diameter, each electrode having a core of substantially the same flame-producing material, the weight of such material in a core being more than about 10 per cent of the weight of said electrode; and passing through said electrodes an alternating current of sufficient intensity to provide a current density of at least 700 amperes per square inch in each electrode.

7. A method of producing a steady and uniform electric arc which comprises positioning cored carbon electrodes in spaced cooperating relation, each electrode containing flame-producing material; and causing sufficient alternating current to flow between said electrodes to produce a current density of at least 550 amperes per square inch in each electrode, whereby separate brilliant portions of luminescent material will be formed and confined within a relatively small volume near each of said electrode tips.

8. A method of producing a steady and uniform electric arc which comprises positioning a pair of cored carbon electrodes in spaced cooperating relation, each electrode containing flame-producing material including at least one rare earth metal compound; and causing sufficient alternating current to flow between said electrodes to produce a current density of at least 550 amperes per square inch in each electrode to form separate brilliant portions of luminescent blue-white material confined within a relatively small volume near each of the electrode tips.

9. A method as defined by claim 8, in which the flame-producing material comprises at least one rare earth metal compound from the cerium group, and the current density is at least 700 amperes per square inch in each electrode.

10. A method of producing a steady and uniform electric arc which comprises positioning a pair of cored carbon electrodes in spaced cooperating relation, each electrode containing flame-producing material including at least one compound selected from the group consisting of the compounds of the alkali and alkaline earth metals; and causing sufficient alternating current to flow between said electrodes to produce a current density of at least 550 amperes per square inch in each electrode to form separate brilliant portions of luminescent material confined within a relatively small volume near each of the electrode tips.

11. A method of producing a source of light of high intrinsic brilliancy which comprises placing the ends of similar carbon electrodes in arc-producing relation, each electrode having a core containing flame-producing material, the weight of such material in a core being from about 10% to about 35% of the weight of said electrode; and passing an alternating current through said electrodes capable of producing therein a current density of about 700 to about 1200 amperes per square inch at a potential about 22 to about 31 volts to provide an arc between said ends having a length in the neighborhood of about 0.19 to about 0.38 inch, said arc being characterized by the fact that it provides a source of light of high intrinsic brilliancy confined within a relatively small volume about each of the electrode tips.

12. A method as defined by claim 11, in which the carbon electrodes are of the same diameter and the flame-producing material in the core of each electrode consists predominantly of a rare earth metal compound.

13. A method as defined by claim 11, in which the carbon electrodes are of the same diameter, the flame-producing material in the core of each electrode comprises a rare earth metal fluoride and consists of about 23% by weight of the electrode, and the brilliant light source is blue-white in character.

14. A method of producing a source of light of high intrinsic brilliancy which comprises placing the ends of two cored carbon electrodes in arc-producing relation, at least one of the said electrodes containing a rare earth metal compound in the core as a flame material, the weight of such material in said core being more than about 10% of the weight of the said electrode; and passing alternating current through said electrodes capable of producing therein a current density of at least about 550 amperes per square inch to provide an arc between said ends, said arc being characterized by the fact that it provides a source of light of high intrinsic brilliancy confined within a relatively small volume about the tip of the electrode containing the rare earth metal compound and that the ends of said electrodes remain substantially flat.

15. A method of producing a steady and uniform light source of high intrinsic brilliancy by means of a carbon electrode having a core containing flame-producing material amounting to more than 10% of the electrode weight which comprises placing said electrode in arc-producing relation with another cored carbon electrode of similar diameter and passing through said electrodes alternating current of sufficient intensity to provide a current density in each electrode of at least about 550 amperes per square inch, the arc formed between said electrodes being characterized by the fact that the said light source is confined within a relatively small volume near an electrode tip and that the ends of said electrodes remain substantially flat.

ERVIN R. GEIB.
STEPHEN W. ORNE.
DAVID B. JOY.